United States Patent [19]

Okimoto et al.

[11] Patent Number: 4,756,284
[45] Date of Patent: Jul. 12, 1988

[54] INTAKE SYSTEM FOR INTERNAL COMBUSTION ENGINE

[75] Inventors: Haruo Okimoto; Seiji Tashima; Naoyuki Koyama, all of Hiroshima, Japan

[73] Assignee: Mazda Motor Corporation, Hiroshima, Japan

[21] Appl. No.: 5,780

[22] Filed: Jan. 21, 1987

[30] Foreign Application Priority Data

Jan. 21, 1986 [JP] Japan .................... 61-11521
Jan. 21, 1986 [JP] Japan .................... 61-11525
Jun. 18, 1986 [JP] Japan .................... 61-141616

[51] Int. Cl.⁴ .................... F02B 27/00; F02B 53/04
[52] U.S. Cl. .................... 123/216; 123/52 MB; 123/242
[58] Field of Search ......... 60/313; 123/52 M, 52 MB, 123/216, 242

[56] References Cited

U.S. PATENT DOCUMENTS

| 1,890,567 | 12/1932 | Baverey | 123/52 MB |
| 4,527,392 | 7/1985 | Sato et al. | 123/52 MB X |
| 4,562,804 | 1/1986 | Tadokoro et al. | 123/216 |
| 4,590,895 | 5/1986 | Yada et al. | 123/52 MB |

FOREIGN PATENT DOCUMENTS

| 835666 | 10/1938 | France | 123/52 MB |
| 115818 | 9/1981 | Japan | 123/52 MB |
| 148024 | 9/1982 | Japan . | |
| 70833 | 4/1984 | Japan . | |
| 126028 | 7/1984 | Japan . | |
| 188027 | 10/1984 | Japan . | |

Primary Examiner—Michael Koczo
Attorney, Agent, or Firm—Fleit, Jacobson, Cohn & Price

[57] ABSTRACT

An intake system for an internal combustion engine having a plurality of engine sections for utilizing the interference effect between engine sections to increase the intake charge for at least two engine sections, has a first intake passage connected to a first intake port of one engine section of the at least two engine sections, and a second intake passage connected to a second intake port of another engine section. The first and second intake passages are communicated with each other by a communicating passage and join each other at a junction portion at upstream ends thereof. The first and second intake passages and the communicating passage are arranged so as to have a common axis in the vicinity of the communicating passage. The junction portion is communicated with the atmosphere and a valve is provided for controlling the opening of the communicating passage in accordance with engine operating condition. The valve is located within the communicating passage. The respective lengths of a passage consisting of a part of the first and second passages and the communicating passage, and a passage consisting of the first and second intake passages and the junction portion are determined so that a compression wave produced in one of the first and second passages can be transmitted to the intake port connected to the other intake passage just before the intake port is closed. This intake system has an advantage that a dynamic effect, particularly an interference effect can be effectively utilized to remarkably increase the intake charge.

23 Claims, 9 Drawing Sheets

INTAKE SYSTEM FOR INTERNAL COMBUSTION ENGINE

BACKGROUND OF THE INVENTION

The present invention relates to an intake system for an internal combustion engine, and more particularly to such an intake system capable of increasing intake charge by utilizing an interference effect between engine sections.

DESCRIPTION OF THE PRIOR ART

It is known to supercharge intake air by utilizing pulsations in intake passages, that is, by utilizing a dynamic effect of intake air such as an interference effect between engine sections and an inertia effect to improve the output of an internal combustion engines.

As well known, the interference effect is a phenomenon arising in internal combustion engines having two or more engine sections whereby intake air is forced to be drawn into an intake port of one of the engine sections at a final stage of the stroke when said intake port is opened, by a compression wave produced in an intake passage by an inertia of the intake air at a moment when an intake port of the other engine section is closed or by a compression wave produced in the intake passage whereby high-pressure exhaust gas remaining in a working chamber at a moment when said intake port is opened flows backward to the intake passage and interferes with the intake air therein. On the other hand, the inertia effect is a phenomenon in which a negative compression wave produced in the intake passage when the intake port is opened is transmitted upstream in the intake passage and is inverted at a portion having a larger volume such as a surge tank to be converted to a positive compression wave, and the intake air is forced to be drawn into a working chamber or combustion chamber by the positive compression wave being transmitted from the larger volume portion to the intake port through the intake passage.

Unexamined Japanese Patent Publication No. 70833/1984 discloses an intake system for a two-rotor type rotary piston engine in which intake passages for two engine sections are communicated with each other by a communication passage downstream of throttle valves and in which the length of passages formed by said communication passage and an intake passage downstream of the communication passage leading to an intake port are the same for both engine sections so that a compression wave produced in the intake passage while the intake port of one of the engine sections is opened or closed can be transmitted to the intake port of the other engine section through said communication passage just before the intake port of the other engine section is closed to utilize the interference effect.

However, in the prior art intake system disclosed in said Japanese Patent Publication, it is impossible to satisfactorily utilize the interference effect over a wide range of engine operating speeds, since the length of the passage formed by the communicating passage and the intake passage downstream of said communicating passage in each of the engine sections is fixed. More specifically, as described above, since the interference effect between engine sections is produced by propagation of the pressure wave within the intake passage provided between a pair of the engine sections, it is necessary in order to make the best use of such effect to determine the length of the intake passage connecting two intake ports so that the pressure wave produced in one of the engine sections can be transmitted to the intake port in the other engine section at the final stage of the stroke when said intake port is opened. More specifically, since after the compression wave is produced in the intake passage of one engine section, the intake port of the other engine section is closed earlier and the compression wave has to be transmitted to the intake port in the other engine section earlier under high speed engine operation, it is necessary to shorten the length of the passage between one and the other intake ports, and, on the other hand, since after the compression wave is produced in the intake passage of one engine section, the intake port of the other engine section is closed earlier and the compression wave has to be transmitted to the intake port in the other engine section later under low speed engine operation, said passage has to be lengthened.

Therefore, it is necessary to vary the length of the passage provided between intake ports of the engine sections in accordance with the engine operating speed in order to make the best use of the interference effect between engine sections over a wider range of engine operating speeds.

In view of the above, there have been proposed intake systems capable of varying the length of the passage between the intake ports of the engine sections in accordance with the engine operating speed.

Unexamined Japanese Patent Publication No. 188027/1984 discloses one such intake system for effectively utilizing the inertia effect in which a spiral intake passage is constituted by two passages so that one is provided within the other and in which the length of the passage between the intake ports of the engine sections can be varied by rotating one passage with respect to the other. However, the structure of the intake system in this prior art system is not only complicated but it cannot be applied to an intake system for producing the interference effect without many difficult modifications.

Further, it might be considered possible to meet this requirement by providing two independent intake passages of different length between two or more engine sections and selecting one of them in accordance with the engine operating speed, but such structure is also impractically complicated and makes the intake system undesirably large.

Furthermore, there has been proposed an intake system as disclosed by unexamined Japanese Patent Publication Nos. 148024/1982 and 126028/1984 to meet the above described requirement in which the intake passages for respective engine sections are joined to each other at a junction portion upstream of the throttle valve and are communicated with each other by a communication passage downstream of said throttle valve and in which there is provided a shutter valve in the communication passage, its opening being controlled to be opened under high engine operating speed, since, in this intake system, it would be possible to vary the length of the passage between the intake ports of the respective engine sections by closing the shutter valve under low engine operating speed to connect the intake ports of the respective engine sections with a longer passage and be able to transmit the compression wave between the intake ports of the respective engine sections through the junction portion and opening the shutter valve under high engine operating speed to connect the intake ports of the respective engine sections with a shorter passage and be able to transmit the compression wave between the intake ports through the communication passage.

However, in this prior art intake system, since the shutter valve has to be arranged so that a valve body thereof is not projected into the intake passage when the shutter valve is opened to prevent the pressure loss through said intake passage from increasing, the dead space formed between the valve body and the portion of the communication passage opening to the intake passage when the shutter valve is closed inevitably becomes larger, and, as a result, the compression wave is inevitably attenuated while it is being transmitted through the intake passage so that the interference effect cannot be satisfactorily utilized under low engine operating speed. Further, since the communicating passage is connected with the intake passage at an angle near 90 degrees, the compression wave is inevitably attenuated while it is being transmitted through the communicating passage. Furthermore, since the shutter valve is provided in this prior art intake system, the pulsations produced, that is, the dynamic effect, is necessarily lowered even under high engine operating speed because of an increase in the pressure loss through the intake passage.

In addition, it is preferable for an intake system to effectively utilize the inertia effect as well as the interference effect between engine sections for increasing the intake charge but no intake system capable of this has been proposed yet.

SUMMARY OF THE INVENTION

It is therefore an object of the present invention to provide an intake system for an internal combustion engine which by a simple structure is capable of increasing an intake charge by utilizing the interference effect between engine sections over a wide range of engine operating speeds.

It is another object of the present invention to provide an intake system for an internal combustion engine which by a simple structure capable of increasing an intake charge by utilizing the inertia effect as well as the interference effect between engine sections over a wide range of engine operating speeds.

It is a further object of the present invention to provide an intake system for an internal combustion engine capable of increasing an intake charge by utilizing compression waves produced in intake passages without dissipating and/or attenuating them.

According to the present invention, the above and other object can be accomplished by an intake system for an internal combustion engine having a plurality of engine sections for utilizing the interference effect between engine sections to increase an intake charge for at least two engine sections, comprising first intake passage means connected to a first intake port of one engine section of said two engine sections, second intake passage means connected to a second intake port of the other engine section, said first and second intake passage means being communicated with each other by communicating passage means and joining each other at a junction portion at upstream ends thereof, said first and second intake passage means and said communicating passage means being arranged so as to have a substantially common axis in the vicinity of said communicating passage means, said junction portion being communicated with the atmosphere and valve means for controlling the opening of said communicating passage means in accordance with engine operating condition, said valve means being located within said communicating passage means, the respective lengths of a passage consisting of a part of said first and second passage means and said communicating passage means, and a passage consisting of said first and second passage means and said junction portion being determined so that a compression wave produced in one of said first and second intake passage means can be transmitted to the intake port connected to the other intake passage means just before said intake port is closed.

In a preferred aspect of the present invention, said valve means consists of a cylindrical rotary valve.

In another preferred aspect of the present invention, said internal combustion engine is a two-rotor type rotary piston engine consisting of first and second engine sections, a casing comprised of first and second rotor housings each of which is formed with an inner wall of trochoidal configuration, an intermediate housing located between said first and second rotor housings and two side housings respectively attached with said first and second rotor housings, each engine section having a rotor of substantially triangular configuration carried by an eccentric shaft, said rotor being planetarily rotatable in sliding contact with the inner wall of said rotor housing to define three working chambers of cyclically variable volumes, said rotors being in 180-degree phase difference in terms of eccentric shaft rotation angle, said intake system comprising first intake passage means connected to a first intake port of one engine section of said first and second engine sections, second intake passage means connected to a second intake port of the other engine section, said first and second intake passage means being communicated with each other by communicating passage means and joining each other at a junction portion at upstream ends thereof, said first and second intake passage means and said communicating passage means being arranged so as to have a substantially common axis in the vicinity of said communicating passage means, said junction portion being communicated with the atmosphere and valve means for controlling the opening of said communicating passage means in accordance with engine operating condition, said valve means being located within said communicating passage means, the respective lengths of a passage consisting of a part of said first and second passage means and said communicating passage means, and a passage consisting of said first and second passage means and said junction portion being determined so that a compression wave produced in one of said first and second intake passage means at a moment when an intake port connected to said intake passage means is closed or opened can be transmitted to the intake port connected to the other intake passage means just before said intake port is closed.

The above and other objects and features of the present invention will become apparent from the following description made with reference to the accompanying drawings.

DESCRIPTION OF THE PREFERRED EMBODIMENT

Figure 1:
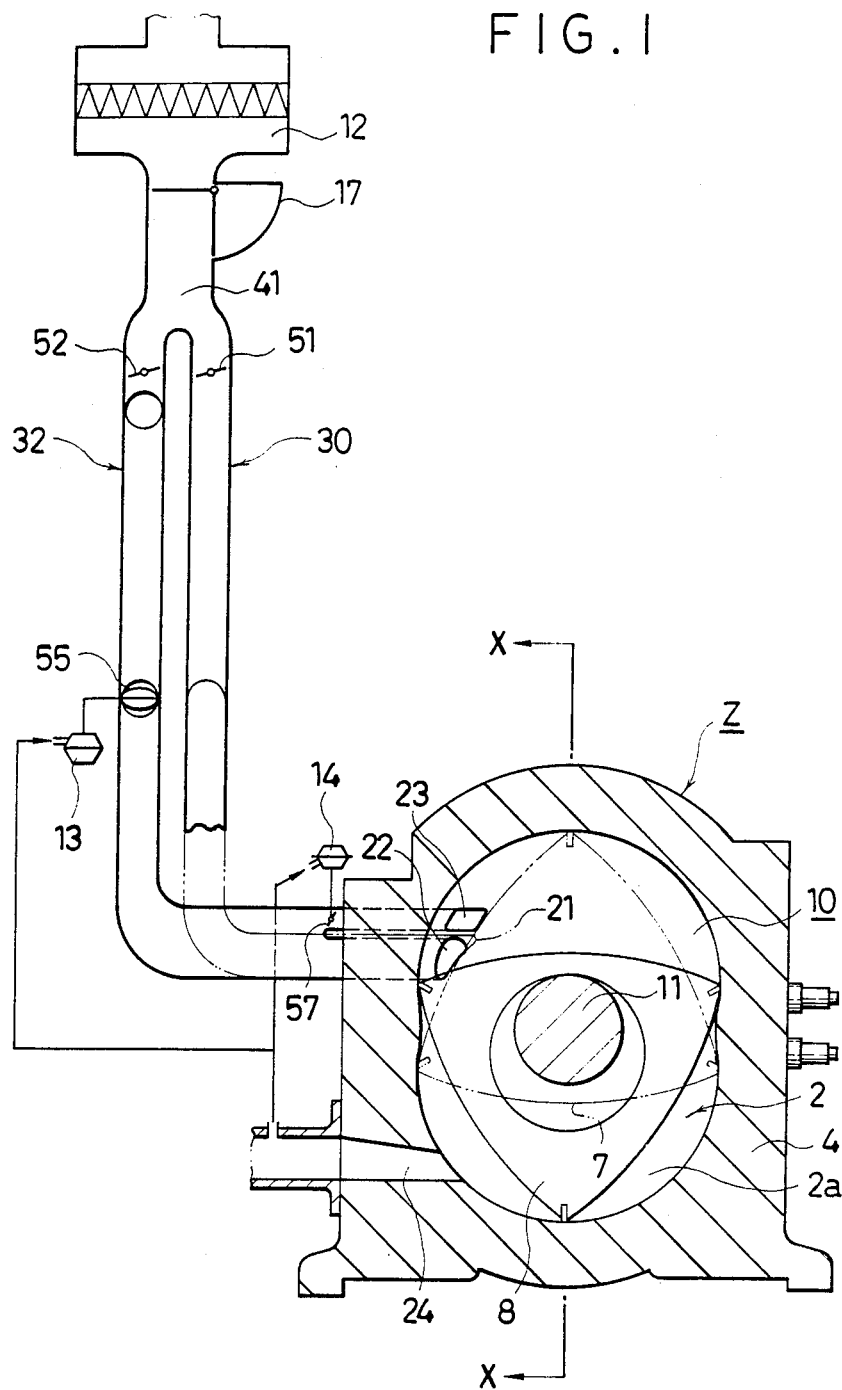
FIG. 1 is a schematic drawing showing a longitudinal cross-sectional view of a rotary piston engine having an intake system which is an embodiment of the present invention.
Figure 2:
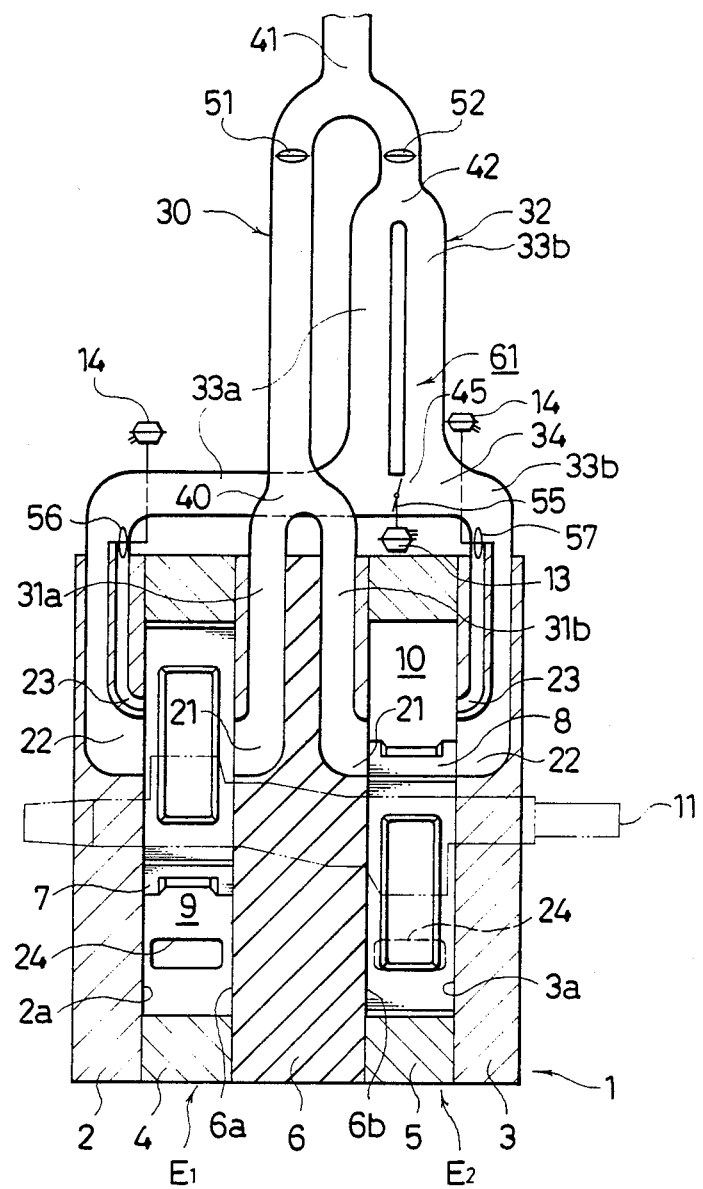
FIG. 2 is a schematic drawing showing a partially cross-sectional view taken along line X—X of FIG. 1.

Referring to FIGS. 1 and 2, there is shown a two-rotor rotary piston engine Z having an intake system which is an embodiment of the present invention. The rotary piston engine Z has two rotor housings 4 and 5 which are formed with inner walls of trochoidal configuration. An intermediate housing 6 is located between the rotor housings 4 and 5 to separate them one from the other. The outside of the rotor housings 4 and 5 are attached with side housings 2 and 3 respectively. Thus, the rotor housings 4 and 5, the intermediate housing 6 and the side housings 2 and 3 constitute a casing 1 and form two engine sections E1 and E2. In the engine section E1 (E2), a rotor cavity 9 (10) is defined and there is disposed therein a rotor 7 (8) of substantially triangular configuration. The rotors 7 and 8 are carried by an eccentric shaft 11 and are rotatable planetarily with apex portions in sliding contact with the inner walls of the rotor housings 4 and 5. The rotors 7 and 8 are 180 degrees out of phase with each other. In the rotor cavity 9 of the engine section E1, there are defined three working chambers whose volumes cyclically change as the rotor 7 rotates, and in the rotor cavity 10 of the engine section E2, there are similarly defined three working chambers.

In each of the engine sections E1 and E2, there is provided an exhaust port 24. On opposite faces 6a and 6b of the intermediate housing 6, there are formed first intake ports 21 as a primary port opening to the respective rotor cavities 9 and 10. The inner surfaces 2a and 3a of the respective side housings 2 and 3 are formed with second intake ports 22 as secondary main ports and third intake ports 23 as secondary auxiliary ports. Each of the second intake ports 22 is located toward the leading side of the respective first intake ports 21 with respect to the rotating direction of the rotor 7 (8) and each of the third intake ports 23 is located toward the leading side of the respective second intake ports 22 with respect to the rotating direction of the rotor 7 (8).

These first, second and third intake ports 21, 22 and 23 are selected to be opened by valve means (not shown). More specifically, only the first intake ports 21 are employed under low load engine operating condition, both the first intake ports 21 and the second intake ports 22 are employed under medium load condition or low engine speed and heavy load condition, and all intake ports 21, 22 and 23 are employed under high engine speed and heavy load condition.

In this embodiment, the openings of the intake ports 21, 22 and 23 are controlled so as to be closed in order of the second intake ports 22, the first intake ports 21 and the third intake ports 23. As a result, under low load engine operating condition or low engine speed and heavy load condition, the first intake ports 21 are closed last, and under high engine speed and heavy load condition, the third intake ports 23 are closed last. Therefore, in order to make use of the interference effect between engine sections, it is necessary to determine the length of the intake passage between the intake ports of the engine sections E1 and E2 so that the compression wave produced in one engine section can be transmitted to the third intake port 23 of the other engine section just before said third intake port 23 is closed under high engine speed and heavy load condition and that the compression wave produced in one engine section can be transmitted to the first intake port 21 of the other engine section just before the first intake port 21 is closed under low engine speed condition.

There is provided a first passage unit 30 forked into a pair of first intake passages 31a and 31b at a first junction portion 40 and the first intake passages 31a and 31b are respectively connected to the first intake ports 21 of the respective engine sections E1 and E2. There is provided a second passage unit 32 comprising a pair of second intake passages 33a and 33b respectively connected to the second intake ports 22 and the third intake ports 23 of the respective engine sections E1 and E2. The first passage unit 30 and the second passage unit 32 join each other at a second junction portion 41 at the upstream ends thereof. The second junction portion 41 is formed so that it has a relatively larger inner volume sufficient for functioning as an inverse portion for inversing the compression wave produced by the inertia effect and communicated with the atmosphere. The pair of the second intake passages 33a and 33b are communicated with each other by a communicating passage 45. There are provided an air flow sensor 17 and an air cleaner 12 upstream of the second junction portion (inverse portion) 41.

A first throttle valve 51 is provided just downstream of the inverse portion 41 within the first passage unit 30. The opening of the first throttle valve 51 is controlled over the whole range of driving conditions by an accelerator pedal (not shown), Therefore, the first intake ports 21 can be communicated with each other by a shorter passage consisting of the first intake passages 31a and 31b or a longer passage consisting of the first intake passages 31a, 31b and a part of the first passage unit 30 downstream of the throttle valve 51 by controlling the opening of the throttle valve 51. As described hereinafter in more detail, since the pulsations in the intake passage between the first intake ports 21 of the respective engine sections E1 and E2 can be effectively utilized under low engine speed condition, the length of the first passage unit 30 should be determined so that the interference effect and the inertia effect can be effectively utilized under a low engine speed condition. For this purpose, in this embodiment, the length of a substantially reverse U-shaped intake passage extending from the first intake port 21 of the first engine section E1 to port 21 of the second engine section E2 is determined so that the interference effect can be effectively utilized under a low engine speed condition, and the length of a intake passage between the respective intake ports 21 via the inverse portion 41 is determined so that the inertia effect can be effectively utilized under a low engine speed condition.

As described above, the second intake passages 33a and 33b are communicated with each other by the communicating passage 45 as shown in FIG. 2 so that the second intake passages 33a and 33b and the communicating passage 45 have a substantially common axis in the vicinity of the communicating passage 45 and there is provided in the communicating passage 45 a first control valve 55 for controlling communication between the second intake passages 33a and 33b through the communicating passage 45. The first control valve 55 is controlled by a diaphragm type actuator 13 operated by exhaust gas pressure of the engine so that it is opened under a high engine speed and heavy load condition such as 5000 rpm to 7000 rpm and that it is closed under the other conditions.

The second passages 33a and 33b join each other at a third junction portion 42 upstream of the portion connected with the communicating passage 45 and are further communicated with the inverse portion 41. There is provided a second throttle valve 52 between the third junction portion 42 and the inverse portion 41 and it is controlled to be opened under a medium or heavy load condition.

Further, there are respectively provided a second control valve 56 and a third control valve 57 in respective inlet portions of the second intake passages 33a and 33b communicated with the third ports 23 of the respective engine sections E1 and E2, and they are controlled by diaphragm type actuators 14 operated by exhaust gas pressure so as to be opened under a high engine speed and heavy load condition.

Therefore, the second intake ports 22 can be selectively communicated with each other by a shorter passage consisting of a part of the respective second intake passages 33a and 33b downstream of the communicating passage 45 and the communicating passage 45 or a longer passage consisting of the second intake passage 33a and 33b and the third junction portion 42 by controlling the opening of the second throttle valve 52 and the first control valve 55, and, similarly, the third intake ports 23 can be selectively communicated with each other by the shorter or longer passage and by controlling the opening of the second throttle valve 52 and the first, second and third control valve 55, 56 and 57.

The length of the second passage unit 32 is determined in the same manner as that of the first passage unit 31 so that the interference effect and the inertia effect can be effectively utilized. More specifically, the length of said longer passage is determined so that the compression wave produced in one engine section can be transmitted to the third intake port 23 of the other engine section just before said third intake port 23 is closed under a high engine speed condition such as 5000 rpm to 7000 rpm and that the interference effect can be satisfactorily utilized under said condition. Further, the length of said shorter passage is determined so that the interference effect can be satisfactorily utilized under a medium engine speed condition such as 2000 rpm to 4000 rpm.

In addition, in this embodiment, the length of a passage connecting the second and third intake ports 22 and 23 of the first engine section E1 with the inverse portion 41 through the second intake passage 33a, and that of a passage connecting the second and third intake ports 22 and 23 of the second engine section E2 with the inverse portion 41 through the second intake passage 33b are respectively determined so that the inertia effect can be effectively utilized under medium engine speed condition. These passages are of equal length. (Although in FIG. 2 they appear to have different lengths, this is only for convenience of illustration.)

The operation mode of the intake system for the two-rotor type rotary piston engine as described above is as follows.

Under a high engine speed and heavy load driving condition, the first and second throttle valves 51 and 52 are opened in accordance with signals from the accelerator pedals and the second and third control valves 56 and 57 are opened. Further, the first control valve 55 is also opened under said condition and the second intake passages 33a and 33b are communicated with each other through the communicating passage 45 so that the compression wave can be transmitted through the shorter passage between the second and third intake ports 22 and 23 of the respective engine sections E1 and E2 and that the intake air can be supercharged into the respective engine sections E1 and E2 by the interference effect arising through the shorter passage. Since the second intake passages 33a and 33b are communicated with each other by the communicating passage 45 so that the communicating passage 45 have a substantially common axis in the vicinity of the communicating passage 45, the compression wave can be transmitted between the respective engine sections E1 and E2 through the second intake passages 33a and 33b without being dissipated or attenuated and the intake charge can be remarkably increased.

On the other hand, under a medium engine speed condition, although the first and second throttle valves 51 and 52 are opened, the first control valve 55 is closed. Therefore, the compression wave cannot be transmitted through the shorter passage but can be transmitted through the longer passage between the respective engine sections E1 and E2 and both the interference effect and the inertia effect can be satisfactorily utilized to increase the intake charge remarkably.

Further, under a low engine speed operation, only the first and second intake ports 21, 22 are opened and the first control valve 55 is closed. Under these circumstances, the compression wave is transmitted from one first intake port 21 to the other only through a passage consisting of the first intake passage 31a and 31b and the upstream part of the first intake passage unit 30 and, therefore, the interference effect and the inertia effect can be utilized through the first passage unit 30.

As described above, according to the intake system of this embodiment, it is possible to remarkably increase the intake charge by satisfactorily utilizing the interference effect between engine sections over a wider range of engine operating speeds from a low engine speed condition to a high engine speed condition.

In the above described intake system, in order to utilize the inertia effect more effectively to increase the intake charge much more, it is more preferable to determine the length of each intake passage as described in the following embodiment.

In this embodiment, according to the finding that the inertia effect can be most effectively utilized in the rotary piston engine in the case where the negative compression wave produced at the intake port of one of the engine sections at the time when the rotor of said engine section takes a position of 135 degrees in terms of the angle of rotation of the eccentric shaft 11 is inverted at the inverse portion such as surge tank to be converted into a positive compression wave and where said positive compression wave is applied to the intake port having the latest closing timing just before it is closed, each of the length L1 of the passage between each of the first intake ports 21 and the inverse portion 41 and the length L2 of the passage between each of the second intake ports 22 and the inverse portion 41 and the length L3 of the passage between each of the third intake ports 23 and the inverse portion 41 is determined so as to satisfy the following formula.

$$N\max = \frac{(X - 135) \times 60 \times A}{360 \times 2L} \quad (1)$$

wherein L (m) is the length of the passage between a particular intake port of the respective engine sections and the inverse portion 41, and Nmax (rpm) is the rated engine rpm of the rotary piston engine which is usually set as 5000 rpm to 7000 rpm, and X (degree) is the angle of rotation of the eccentric shaft 11, and A is the sonic speed (343 m/s at 20 degrees centigrade).

(X−135) in the above formula (1) means a period from the time when the compression wave having the maximum level is produced to the time when the intake port having the latest closing timing is closed.

With respect to the opening and closing timing of each of the intake ports, they can be determined, for example, so that the first, second and third intake ports 21, 22 and 23 have respective opening periods of 30 to 310 degrees, 30 to 300 degrees and 30 to 350 degrees in terms of the angle of rotation of the eccentric shaft 11. In this case, the closing timing 350 degrees of the third intake ports 23 is employed as the X in the formula (1) under high engine speed any heavy load condition. Further, supposing that L1, L2 and L3 are the same value L and substituting 350 degrees and 5000 to 7000 rpm for X and Nmax in formula (1) respectively, 0.88 to 1.2 (m) is obtained as the value of L which produces the maximum inertia effect at around the rated engine rpm and under heavy load condition.

Further, in case where L1, L2 and L3 are set to be 0.88 to 1.2 (m) respectively, a high level of the inertia effect can be obtained under a medium engine speed and heavy load condition as well as under a high engine speed and heavy load condition. More specifically, since the third intake ports 23 are maintained closed and the first intake ports 21 are closed lastly under such operating condition, substituting 310 degrees and 0.88 to 1.2 m for X and L respectively in the formula (1), 4170 to 5680 rpm is obtained as Nmax and it is found that by setting L1, L2 and L3 to be 0.88 to 1.2 m, which produces the maximum inertia effect under a high engine speed and heavy load condition, a high level of the inertia effect can also be obtained under a medium engine speed (4170 to 5680 rpm) and heavy load condition.

According to this embodiment, in addition to the interference effect between engine sections, the inertia effect can be more effectively utilized to increase the intake charge more remarkably.

Figure 3:
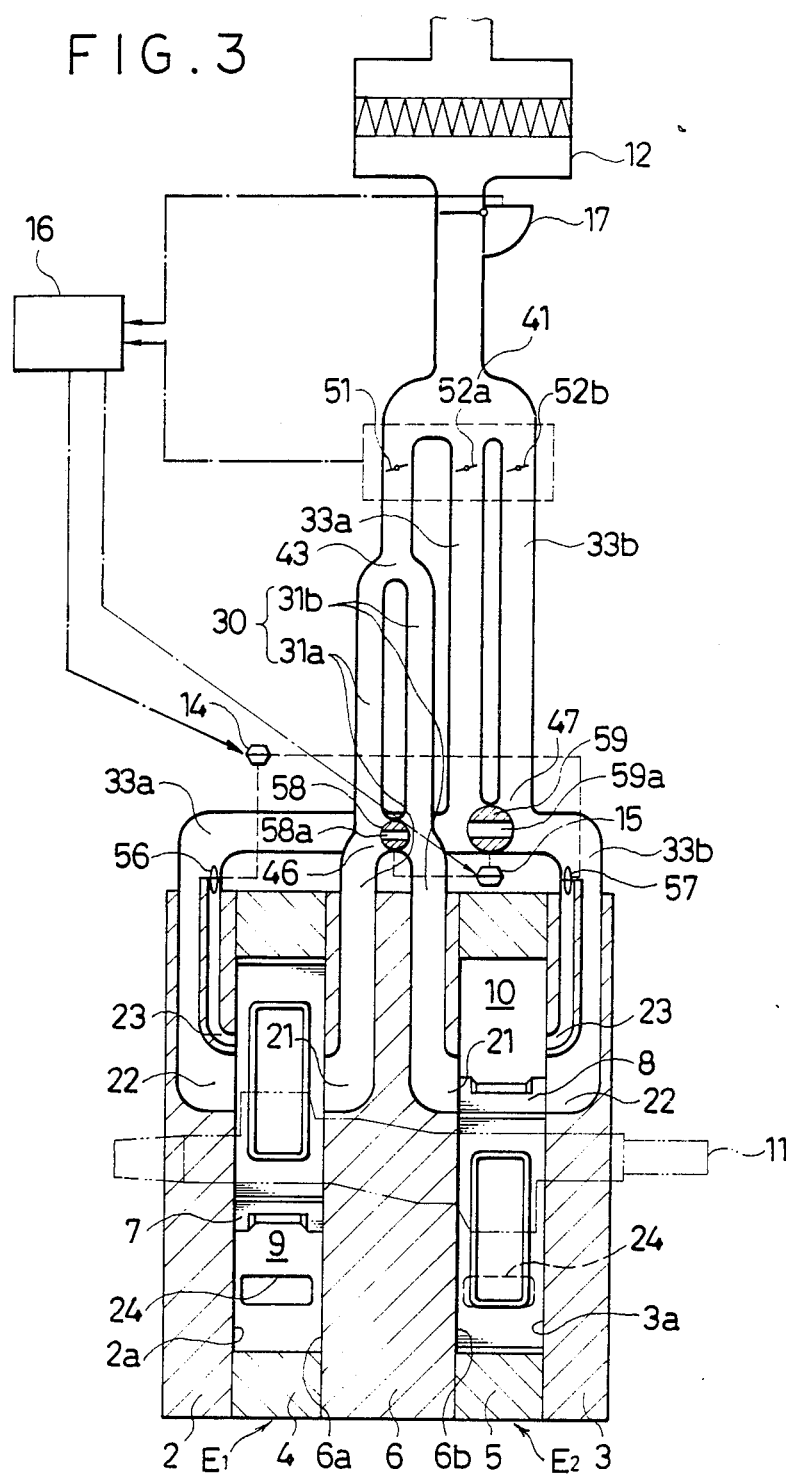
FIG. 3 is a schematic drawing showing an arrangement of a rotary piston engine having an intake system which is another embodiment of the present invention.
Figure 4:
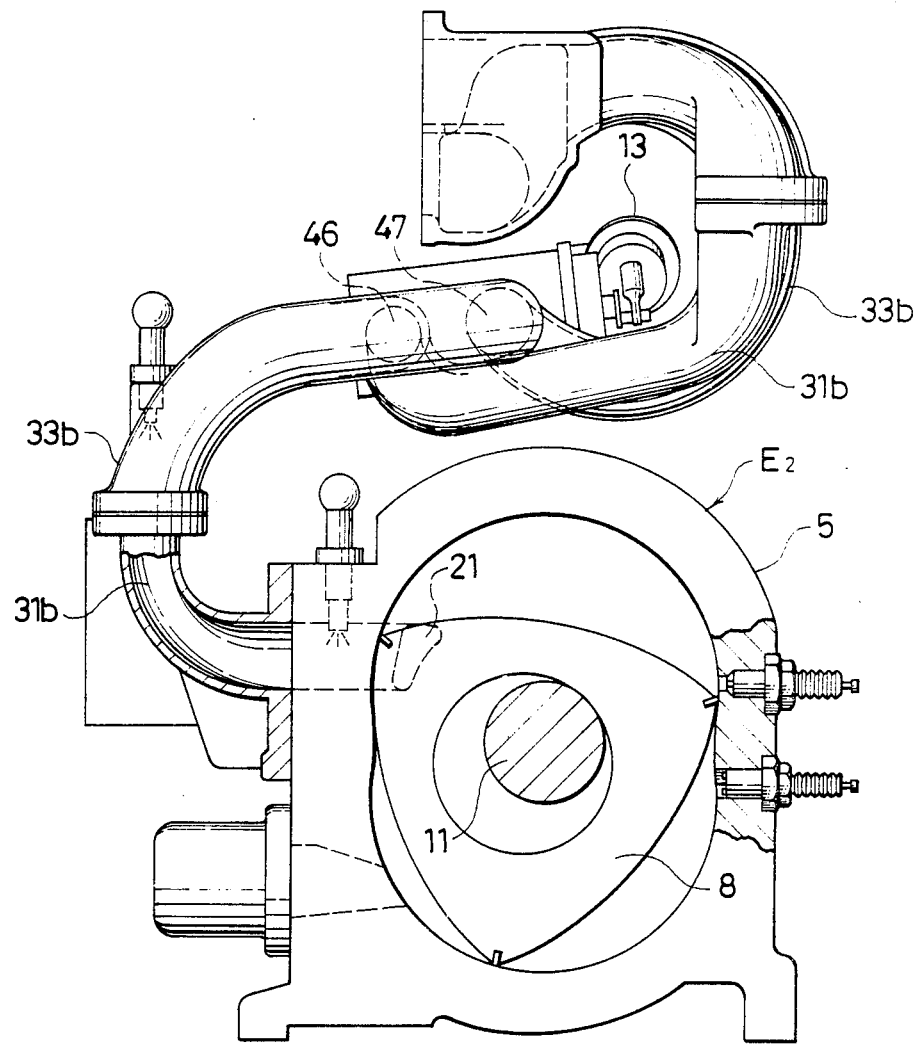
FIG. 4 is a schematic drawing showing a side view of a rotary piston engine having an intake system which is another embodiment of the present invention.
Figure 5:
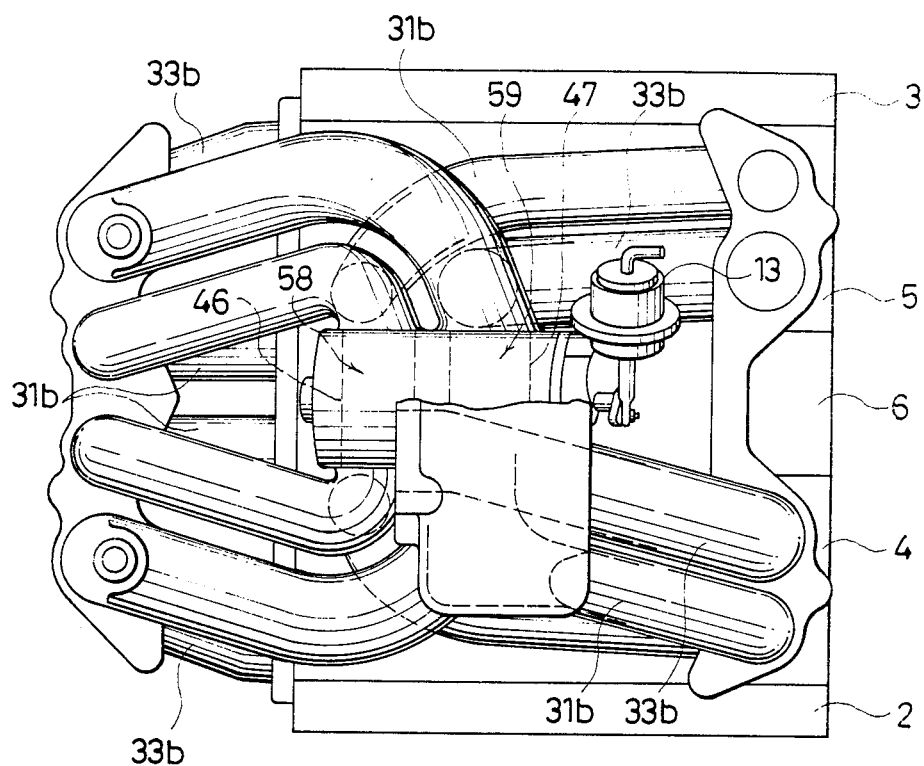
FIG. 5 is a schematic drawing showing a plan view of a rotary piston engine having an intake system which is another embodiment of the present invention.

Referring to FIGS. 3, 4 and 5, there is shown a two-rotor type rotary piston engine having an intake system which is a further embodiment of the present invention. In FIG. 3, the basic arrangements of the rotary piston engine are similar to those of the previous embodiment as shown in FIGS. 1 and 2 so that corresponding parts are designated by the same numerals as in the previous embodiment. In this intake system, the first passage unit 30 consists of the pair of first intake passages 31a and 31b which join each other at a fourth junction portion 43 upstream thereof and are communicated with each other by the communicating passage 46 so that the first intake passages 31a and 31b and the communicating passage 46 have a substantially common axis in the vicinity of the communicating passage 46. There is provided a fourth control valve 58 within the communicating passage 46. In the first passage unit 30, the first throttle valve 51 is provided upstream of the fourth junction portion 43. The first intake ports 21 of the respective engine sections E1 and E2 are respectively connected with the first intake passages 31a and 31b respectively. The second intake passages 33a and 33b are communicated with each other by a communicating passage 47 in the same manner as in the previous embodiment and there is provided a fifth control valve 59 within the communicating passage 47. The fourth and fifth control valve 58 and 59 are driven by the actuator 13 which is located adjacent to a curved portion of the second intake passage 33b and to be partially encircled by it as shown in FIG. 4. (Although in FIG. 3 it does not appear to be so located, this is only for convenience of illustration.) There are provided third and fourth throttle valves 52a and 52b just downstream of the inverse portion 41 in the respective second intake passages 33a and 33b. The second and third intake ports 22 and 23 of the first engine section E1 are connected with the second intake passage 33a and those 22 and 23 of the second engine section E2 are connected with the second intake passage 33b in a similar manner to the previous embodiment.

Figure 6:
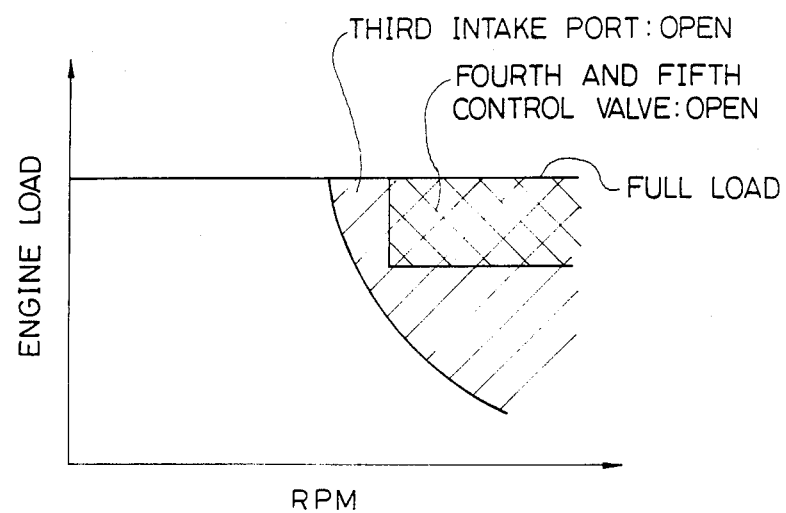
FIG. 6 is a graph showing the manner of operation of control valves employed in an intake system which is another embodiment of the present invention.

In this embodiment, the second intake ports 22 are controlled so as to be opened only under a heavy load condition and the second and third control valve 56 and 57 are driven by an actuator 14 operated by a controller 16 so that they are opened under a high engine speed and heavy load condition and closed under the other condition as shown FIG. 6. The controller 16 receives signals representating the opening of the first, third and fourth throttle valves 51, 52a and 52b, signals output by the air flow sensor 17 and signals representating the engine rpm.

In this embodiment, each of the fourth and fifth control valves 58 and 59 consists of a cyclindrical rotary valve. Valve bodies 58a and 59a of the respective control valve 58 and 59 are integrally formed and have a common shaft rotatable by a diaphragm type actuator 15 operated by the intake pressure. The actuator 15 is controlled by the controller 16 so that it opens the fourth and fifth control valves 58 and 59 under a high engine speed and heavy load condition and closes them under other conditions as shown in FIG. 6.

Further, in this embodiment, the first and second intake passages 31a, 31b, 33a and 33b are arranged so that the first intake passages 31a and 31b are located between the second intake passage means 33a and 33b downstream of a portion connected with the communicating passage 46 and that the second intake passage means 33a and 33b are located between the first passage means upstream of a portion connected with the communicating passage 47. According to such structure, since the curvature of the intake passage connected to the intake port controlled to be opened under heavy load condition is decreased, it is possible to reduce the pressure loss of intake air through the intake passage under a condition where a larger amount of intake air is required.

The operation mode of this intake system is as follows.

Under a low engine speed condition, the fourth and fifth control valve 58 and 59 are closed and, as a result, the first intake ports 21 of the respective engine sections E1 and E2 are communicated with each other by a passage consisting of the first intake passages 31a and 31b and the fourth junction portion 43, and the second intake ports 22 are communicated with each other by the passage consisting of the second intake passages 33a and 33b and the second junction portion 41. In other words, the first intake ports 21 and the second intake ports 22 of the respective engine other by the longer path and the interference effect can be utilized sufficiently. Further, since each of the fourth and fifth control valves 58 and 59 is constituted by the cylindrical rotary valve, the dead space formed between the valve bodies 58a and 59a and the communicating passages 46 and 47 can be reduced and it is possible to prevent the pressure wave being transmitted within the each passage from being dissipated and attenuated.

Under a high engine speed and heavy load condition, the fourth and fifth control valves 58 and 59 are opened and, as a result, the first intake ports 21 of the respective engine sections E1 and E2 are communicated with each other by a passage consisting of a downstream part of the first intake passages 31a and 31b and the communicating passage 46, and the second intake ports 22 are communicated with each other by a passage consisting of a downstream part of the second intake passages 33a and 33b and the communicating passage 47. In other words, the first intake ports 21 and the second intake ports 22 of the respective engine sections E1 and E2 are respectively connected by a shorter path and the inertia effect can be utilized sufficiently. Further, since the first intake passages 31a and 31b and the communicating passage 46 are arranged so that they have a substantially common axis, and the second intake passages 33a and 33b and the communicating passage 47 are arranged so that they have a substantially common axis, the pressure loss between the first intake ports 21 and between the second intake ports 22 can be reduced to increase the interference effect between engine sections.

Figure 7:
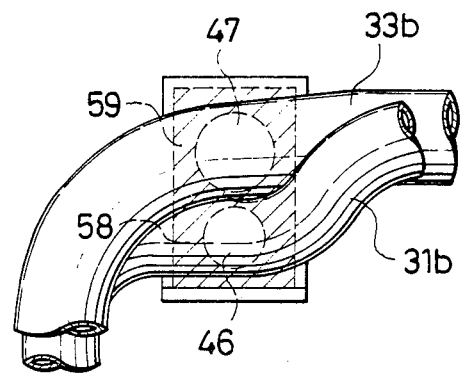
FIG. 7 is a schematic drawing showing a longitudinal cross-sectional view of the communicating passage employed in a further embodiment of the present invention.
Figure 8:
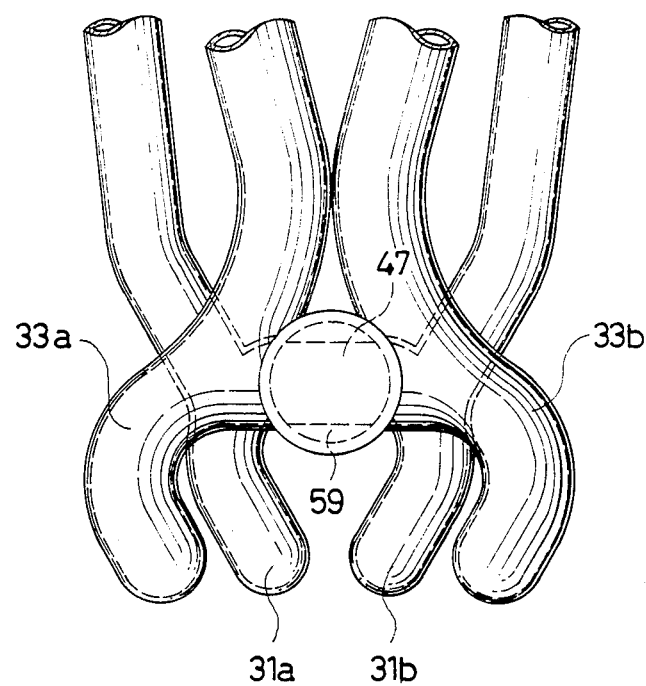
FIG. 8 is a schematic drawing showing a plan view of the communicating passage shown in FIG. 7.

FIGS. 7 and 8 show another arrangement of the fourth and fifth control valves 58 and 59. In FIGS. 7 and 8, the fourth and fifth control valves 58 and 59 are constituted by vertically arranging two cylindrical rotary valves in contact with each other. Although such structure can reduce the dead space formed between the valve bodies 58a and 59a and the communicating passages 46 and 47, it is insufficient to prevent the compression wave from being dissipated and attenuated since the passages 31a and 31b (33a and 33b) to be communicated and the communicating passage 46 (47) do not have a substantially common axis in the vicinity of the communicating passage.

Figure 9:
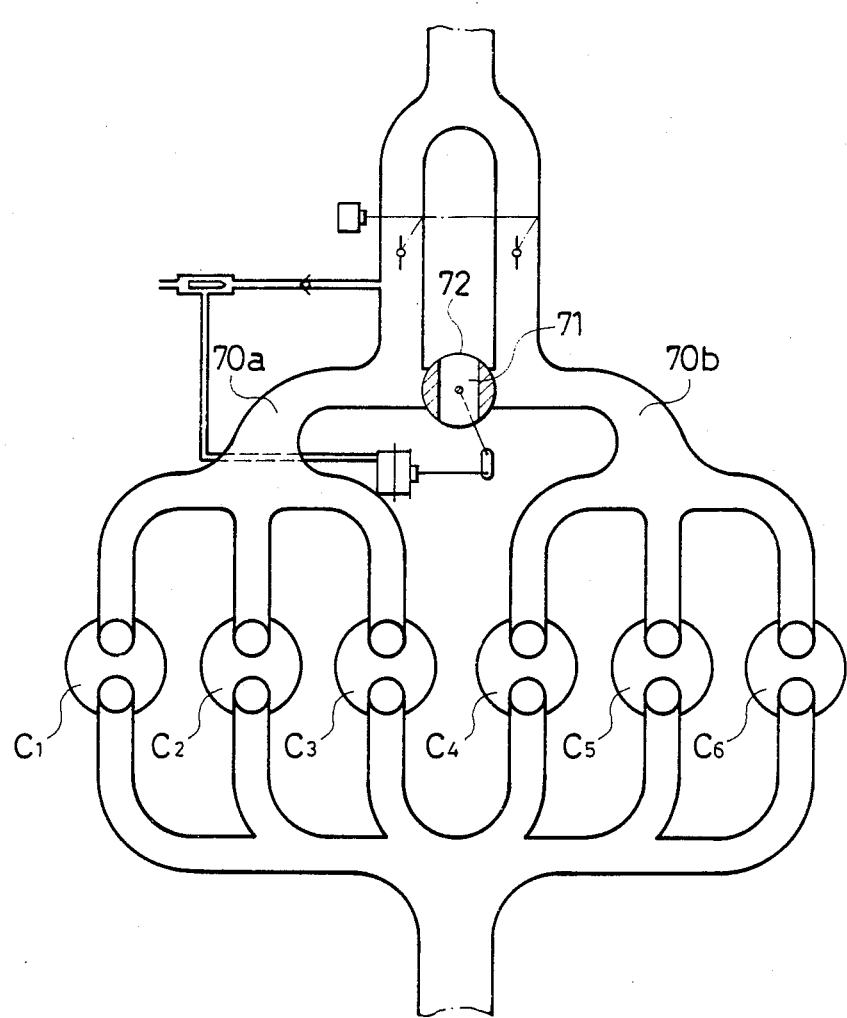
FIG. 9 is a schematic drawing showing a reciprocating engine having an intake system which is a further embodiment of the present invention.
Figure 10:
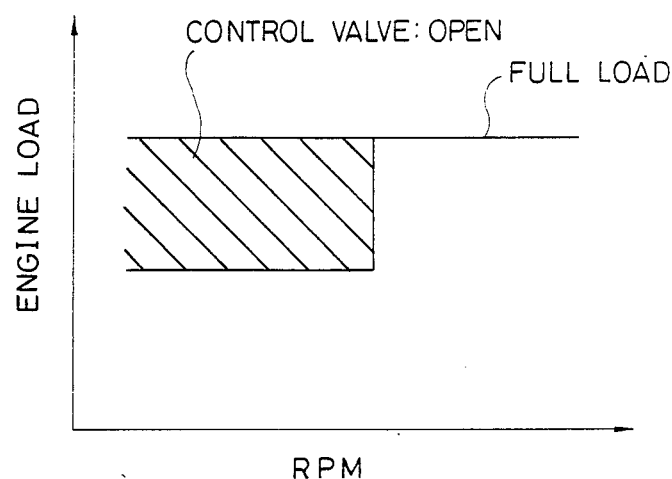
FIG. 10 is a graph showing the manner of operation of a control valve employed in an intake system which is a further embodiment of the present invention.

FIG. 9 shows a reciprocating engine having an intake system which is a further embodiment of the present invention. Referring to FIG. 9, the reciprocating engine has six cylinders C1, C2, C3, C4, C5 and C6 and they are divided into two groups C1 to C3 and C4 to C6 so that the intake stroke does not proceed succesively between cylinders belonging to the same group. There are provided intake passage units 70a and 70b. Each of them is forked into three intake passages at a downstream portion thereof and each of the intake passages is connected to the intake port (not shown) of one of the cylinders C1, C2, C3, C4, C5 and C6. The intake passage units 70a and 70b are communicated with each other by a communicating passage 71 so that both intake passages 70a and 70b and the communicating passage 71 have a substantially common axis in the vicinity of the communicating passage 71 and there is provided within the communicating passage 71 a control valve 72 controlled to be opened at least under a high engine speed and heavy load condition as shown in FIG. 9. The control valve 72 is constituted by a cylindrical rotary valve.

According to this embodiment, since it is possible to vary the length of the path between the intake ports of the cylinders of one group by controlling the opening of the control valve 72 in accordance with engine rpm and the intake passage units 70a and 70b are communicated by the communicating passage 71 so that the intake passage units 70a and 70b and the communicating passage 71 have a common axis, the same effects can be obtained as those obtained in the previous embodiments. Further, since the cylindrical rotary valve is employed as the control valve 72, the same effects can be obtained as by the embodiment shown in the FIG. 3. Furthermore, since six cylinders are divided into two groups, in each of which the intake stroke does not proceed succesively between cylinders belonging thereto, the compression wave produced in one of the cylinders of one group can be transmitted to only the cylinder of the other group whose intake port is opened just before said intake port is closed.

As described above, in accordance with the present invention, the interference effect between engine sections can be satisfactorily utilized to increase the intake charge remarkably.

The present invention has thus been shown and described with reference to specific embodiments. However, it should be noted that the present invention is in no way limited to the details of the described arrangements but changes and modifications may be made without departing from the scope of the appended claims.

For example, although a plurality of the intake ports are provided for each engine section in the above described embodiments, it is possible to provide only a main intake port for each engine section. Further, the cylindrical rotary valve may be employed in the first embodiment shown in FIGS. 1 and 2 and the length of each intake passage in the third embodiment shown in FIG. 3 may be determined in a manner described in the second embodiment to utilize the inertia effect more effectively.

What is claimed:

1. An intake system for an internal combustion engine having a plurality of engine sections for utilizing the interference effect between engine sections to increase an intake charge for at least two engine sections, comprising first intake passage means connected to a first intake port of one engine section of said at least two engine sections, second intake passage means connected to a second intake port of another engine section, said first and second intake passage means being communicated with each other by communicating passage means and having portions upstream of the communicating passage means which join each other at a junction portion, said first and second intake passage means and said communicating passage means being arranged so as to have a substantially common axis in the vicinity of said communicating passage means, said junction portion being communicated with the atmosphere and valve means for opening and closing said communicating passage means in accordance with an engine operating condition, said valve means being located within said communicating passage means and near said first and second intake passage means, said valve means when closed providing a first passage between the first and second intake ports, the first passage comprising the first and second passage means in their entirety including the junction portion, said valve means when open forming a second passage between the first and second intake ports, the second passage comprising parts of the first and second passage means which are downstream of the communicating passage means and the communicating passage means itself, the second passage having a length for providing an intake interference effect between the first and second intake ports in a 5000 to 7000 RPM engine speed range.

2. An intake system in accordance with claim 1 in which said valve means consists of a cylindrical rotary valve.

3. An intake system in accordance with claim 1 in which at least one of the first and second intake passage means is curvedly formed and which includes an actuator for driving said valve means, said actuator being located adjacent to said curved portion of one of the intake passage means and being partly encircled by it.

4. An intake system for a two-rotor type rotary piston engine comprising first and second engine sections, a casing comprised of first and second rotor housings each of which is formed with an inner wall of trochoidal configuration, an intermediate housing located between said first and second rotor housings and two side housings respectively attached with said first and second rotor housings, each engine section having a rotor of substantially triangular configuration carried by an eccentric shaft, said rotor being planetarily rotatable in sliding contact with the inner wall of said rotor housing to define three working chambers of cyclically variable volumes, said rotors being in 180-degree phase difference in terms of eccentric shaft rotation angle, said intake system comprising first intake passage means connected to a first intake port of one engine section of said first and second engine sections, second intake passage means connected to a second intake port of the other engine section, said first and second intake passage means being communicated with each other by communicating passage means and joining each other at a junction portion at upstream ends thereof, said first and second intake passage means and said communicating passage means being arranged so as to have a substantially common axis in the vicinity of said communicating passage means, said junction portion being communicated with the atmosphere and valve means for opening and closing said communicating passage means in accordance with an engine operating condition, said valve means being located within said communicating passage means and near said first and second intake passage means, said valve means when closed providing a first passage between the first and second intake ports, the first passage comprising the first and second passage means in their entirety including the junction portion, said valve means when open forming a second passage between the first and second intake ports, the second passage comprising parts of the first and second passage means which are downstream of the communicating passage means and the communicating passage means itself, the second passage having a length for providing an intake interference effect between the first and second intake ports in a 5000 to 7000 RPM engine speed range.

5. An intake system in accordance with claim 4 in which at least one of the first and second intake passage means is curvedly formed and which includes an actuator for driving said valve means, said actuator being located adjacent to said curved portion of one of the intake passage means and to partly encircled by it.

6. An intake system in accordance with claim 4 in which said junction portion has a relatively larger inner volume than that of the residual portion of said first and second intake passage means and in which the length of each passage between said intake ports of the respective engine sections and said junction portion is determined to satisfy the following formula;

$$N\max = \frac{(X - 135) \times 60 \times A}{360 \times 2L}$$

wherein L (m) is the length of the passage between each intake ports of the respective engine sections and the junction portion and Nmax (rpm) is the rated engine rpm and X (degree) is the angle of rotation of eccentric shaft and A is the sonic speed.

7. An intake system in accordance with claim 4 in which said first and second intake passage means have a substantially common axis in the vicinity of said junction portion.

8. An intake system for an internal combustion engine having a plurality of engine sections for utilizing the interference effect between engine sections to increase the intake charge for at least two engine sections, comprising first intake passage means connected to a first intake port of one engine section of said at least two engine sections, second intake passage means connected to a second intake port of another engine section, said first and second intake passage means being communicated with each other by first communicating passage means and having portions upstream of the first communicating passage means which join each other at a junction portion at upstream ends thereof, said first and second intake passage means and said first communicating passage means being arranged so as to have a substantially common axis in the vicinity of said first communicating passage means, said junction portion being communicated with the atmosphere, valve means for opening and closing of said first communicating passage means so as to open said first communicating passage means at least during a high engine speed and heavy load engine operating condition, said valve means being located within said first communicating passage means and near said first and second passage means, said valve means when closed providing a first passage between the first and second ports, the first passage comprising the first and second passage means in their entirety including the junction portion, said valve means when opened providing a second passage between the first and second inlet ports, the second passage comprising parts of the first and second passage means which are downstream of the first communicating passage means and the communicating passage means itself, at least one additional intake port in each engine section, additional intake passage means for each additional intake port of the respective engine section, said additional intake passage means being communicated with each other by additional communicating passage means and joining each other at an additional junction portion at upstream ends thereof, said additional intake passage means and said additional communicating passage means being arranged so as to have a substantially common axis in the vicinity of said additional communicating passage means, said additional junction portion being communicated with the atmosphere, an additional valve means for opening and closing of said additional communicating passage means so as to open said additional communicating passage means at least during a high speed and heavy load engine operating condition, said additional valve means being located within said communicating passage means, said additional valve means when closed providing a first passageway between the respective additional intake ports, the first passageway comprising the respective additional passage means in their entirety including the additional junction portion, the additional valve means when open providing a second shorter passageway means between the additional ports, the second passageway means comprising parts of the additional passage means downstream of the additional communicating passage means and the additional passage means itself.

9. An intake system in accordance with claim 8 including means for utilizing said additional intake ports connected to said additional intake passage means under a heavy load condition.

10. An intake system in accordance with claim 8 in which said first and second intake ports are controlled to be opened under a low load condition and in which said two additional intake ports connected to said additional intake passage means are controlled to be opened under a heavy load condition.

11. An intake system in accordance with claim 10 in which each of said valve means consist of a cylindrical rotary valve and in which valve bodies thereof are integrally formed and have a common shaft.

12. An intake system in accordance with claim 8 in which said high speed engine operating condition is 5000 to 7000 rpm.

13. An intake system for a two-rotor type rotary piston engine comprising first and second engine sections, a casing having first and second rotor housings each of which is formed with an inner wall of trochoidal configuration, an intermediate housing located between the first and second rotor housings and two side housings respectively attached with said first and second rotor housings, each engine section having a rotor of substantially triangular configuration carried by an eccentric shaft, said rotor being planetarily rotatable in sliding contact with the inner wall of said rotor housing to define three working chambers of cyclically variable volumes, said rotors having 180-degree phase difference in terms of eccentric shaft rotation angle, said intake system comprising first intake passage means connected to a first intake port of one engine section of said first and second engine section, second intake passage means connected to a second intake port of the other engine section, said first and second intake passage means being communicated with each other by first communicating passage means and having portions upstream of the first communicating passage means which join each other at a junction portion at upstream ends thereof, said first and second intake passage means and said first communicating passage means being arranged so as to have a substantially common axis in the vicinity of said first communicating passage means, said junction portion being communicated with the atmosphere, valve means for opening and closing of said first communicating passage means so as to open said first communicating passage means at least during a high engine speed and heavy load engine operating condition, said valve means being located within said first communicating passage means and near said first and second passage means, said valve means when closed providing a first passage between said first and second ports, the first passage comprising the first and second passage means in their entirely including the junction portion, said valve means when open providing a second passage between the first and second inlet ports, the second passage comprising parts of the first and second passage means which are downstream of the first communicating passage means and the communicating passage means itself, at least one additional intake port in each engine section, additional intake passage means for each additional intake port of the respective engine sections, said additional intake passage means being communicated with each other by additional communicating passage means and joining each other at an additional junction portion at upstream ends thereof, said additional intake passage means and said additional communicating passage means being arranged so as to have a substantially common axis in the vicinity of said additional communicating passage means, said additional junction portion being communicated with the atmosphere, and additional valve means for opening and closing of said additional communicating passage means so as to open said additional communicating passage means at least during a high speed and heavy load engine operating condition, said additional valve means being located within said communicating passage means, said additional valve means when closed providing a first passageway between the respective additional intake ports, the first passageway comprising the respective additional passage means in their entirety including the additional junction portion, the additional valve means when open providing a second shorter passageway means between the additional ports, the second passageway means comprising parts of the additional passage means downstream of the additional communicating passage means and the additional communicating passage means itself.

14. An intake system in accordance with claim 13 in which said additional intake ports connected to said additional intake passage means are controlled to be opened under heavy load condition.

15. An intake system in accordance with claim 14 in which each of said additional intake passage means is further communicated with other intake ports and in which said additional intake ports are controlled to be opened under all engine speed conditions and in which said other intake ports are controlled to be opened under a heavy load condition or a high engine speed condition.

16. An intake system in accordance with claim 14 in which the inner surfaces of the respective side housings are formed with said additional intake ports controlled to be opened under heavy load condition and in which there are formed said intake ports controlled to be opened under low load condition on opposite faces of said intermediate housing and in which said additional intake passage means are arranged so that they are located outside of said first and second intake passage means downstream of a portion connected with said communicating passage means and that are located between said first and second intake passage means upstream of said portion.

17. An intake system in accordance with claim 13 in which said first and second intake ports are controlled to be opened under low load condition and in which said two additional intake ports connected to said at least two additional intake passage means are controlled to be opened under heavy load condition.

18. An intake system in accordance with claim 17 in which each of said valve means consist of a cylindrical rotary valve and in which valve bodies thereof are integrally formed and have a common shaft.

19. An intake system in accordance with claim 13 in which said valve means consists of a cylindrical rotary valve.

20. An intake sytem in accordance with claim 13 in which said high speed engine operating condition is 5000 to 7000 rpm.

21. An intake system for an internal combustion engine having a plurality of engine sections for utilizing the interference effect between engine sections to increase the intake charge for at least two engine sections, comprising first intake passage means connected to a first intake port of one engine section of said at least two engine sections, second intake passage means connected to a second intake port of another engine section, third intake passage means connted to a third intake port of one engine section of said at least two engine sections, fourth intake passage means connected to a fourth intake port of another engine section, said first and second intake ports being opened under heavy load engine operating condition, said first and second intake passage means being communicated with each other by communicating passage means and joining each other at a junction at upstream ends thereof, said first and second intake passage means and said communicating passage means being arranged so as to have a substantially common axis in the vicinity of said communicating passage means, said junction portion being communicated with the atmosphere, and valve means for controlling the opening of said communicating passage means so as to open said communicating passage means under at least high engine speed and heavy load engine operating condition, said valve means being located within said communicating passage means, said valve means when closed providing a first passage between the first and second intake ports, the first passage comprising the first and second passage means in their entirety including the junction portion, said valve means when open forming a second passage between the first and second intake ports, the second passage comprising parts of the first and second passage means which are downstream of the communicating passage means and the communicating passage means itself, the second passage having a length for providing an intake interference effect between the first and second intake ports in a 5000 to 7000 RPM engine speed range.

22. An intake system for a two-rotor type rotary piston engine comprising of first and second engine section, a casing comprised of first and second rotor housings each of which is formed with an inner wall of trochoidal configuration, an intermediate housing located between said first and second rotor housings and two side housings respectively attached with said first and second rotor housings, each engine section having a rotor of substantially triangular configuration carried by an eccentric shaft, said rotor being planetarily rotatable in sliding contact with the inner wall of said rotor housing to define three working chambers of cyclically variable volumes, said rotors being in 180-degree phase difference in terms of eccentric shaft rotation angle, said intake system comprising first and second intake passage means connected to first and second intake ports of one engine section of said first and second engine sections respectively, third and fourth intake passage means connected to third and fourth intake ports of the other engine section respectively, said first and third intake ports being opened under heavy load engine operating condition at a timing when said rotor takes a position of 30 to 350 degrees after top dead center of the exhaust stroke in terms of eccentric shaft rotation angle respectively, said second and fourth intake ports being opened under other mode than heavy load engine operating condition at a timing when said rotor takes a position of 30 to 310 degrees after top dead center of the exhaust stroke in terms of eccentric shaft rotation angle respectively, said first and third intake passage means being communicated with each other by communicating passage means and joining each other at a junction at upstream ends thereof, said first and third intake passage means and said communicating passage means being arranged so as to have a substantially common axis in the vicinity of said communicating passage means, said junction portion being communicated with the atmosphere, and valve means for controlling the opening of said communicating passage means so as to open said communicating passage means under 5000 to 7000 rpm, said valve means being located within said communicating passage means and near said first passage means, the length of a passage consisting of a part of said first and third passage means and said communicating passage means and formed by opening said valve means being 0.88 to 1.2 m.

23. An intake system for an internal combustion engine having a plurality of engine sections for utilizing the interference effect between engine sections to increase the intake charge for at least two engine sections, comprising first intake passage means connected to a first intake port of one engine section of said at least two engine section, second intake passage means connected to a second intake port of another engine section, said first and second intake passage means being communicated with each other by communicating passage means and joining each other at a junction at upstream ends thereof, said first and second intake passage means and said communicating passage means being arranged so as to have a substantially common axis in the vicinity of said communicating passage means, said junction portion being communicated with the atmosphere, and valve means for controlling the opening of said communicating passage means so as to open said communicating passage means under at least high engine speed and heavy load engine operating condition, said valve means being located within said communicating passage means and near said first and second passage means, the length of a passage consisting of a part of said first and second passage means and said communicating passage means and formed by opening said valve means being determined so that the interference effect is produced therein under 5000 to 7000 rpm, a portion of said first intake passage means between said first intake port and said communicating passage means and a portion of said second passage means between said second intake port and said communicating passage means being respectively formed smoothly and arranged symmetrically to each other so that both portions as a whole forms substantially circular arc.

* * * * *